United States Patent [19]
Feldman

[11] Patent Number: 5,407,255
[45] Date of Patent: Apr. 18, 1995

[54] AUTOMOBILE TIRES ACCESSORY

[75] Inventor: Joseph Feldman, Tel Aviv, Israel

[73] Assignee: Rav-Car Industries Ltd., Corp. of Israel, Arieh, Israel

[21] Appl. No.: 179,311

[22] Filed: Jan. 10, 1994

[30] Foreign Application Priority Data

Jan. 12, 1993 [IL] Israel .................................. 104368

[51] Int. Cl.⁶ ............................................. B65B 15/00
[52] U.S. Cl. ................................... 301/38.1; 301/40.2; 301/40.3
[58] Field of Search .................... 301/38.1, 39.1, 40.1, 301/40.2, 40.3, 40.4, 40.6, 41.1, 44.4

[56] References Cited

U.S. PATENT DOCUMENTS

| | | | |
|---|---|---|---|
| 2,201,489 | 5/1940 | Hill | 301/39.1 |
| 2,257,543 | 9/1941 | Toby | 301/39.1 |
| 3,295,894 | 1/1967 | Perry | 301/38.1 |
| 3,679,267 | 7/1972 | Zachmann | 301/38.1 |

FOREIGN PATENT DOCUMENTS

| | | | |
|---|---|---|---|
| 229683 | 7/1987 | European Pat. Off. | 301/40.1 |
| 285903 | 10/1988 | European Pat. Off. | 301/40.1 |
| 1043038 | 11/1953 | France | 301/38.1 |
| 1-132410 | 5/1989 | Japan | 301/40.1 |

*Primary Examiner*—Russell D. Stormer
*Attorney, Agent, or Firm*—Ostrolenk, Faber, Gerb & Soffen

[57] ABSTRACT

Instead of changing a flat tire, a device is provided which comprises a circular plate of a diameter substantially equal to that of the tire, provided with a rubber or the like rim allowing the driving of the automobile thereon in substitution of the flat tire. A segment portion of the plate is hinged thereto so that it is foldable away of the plane of the plate. The plate is mountable to the wheel rim, means being provided for securing the segment portion to the plate in the non-folded position thereof after driving the automobile by a short distance. A modified version of the device is applicable to snow or sand driving.

7 Claims, 5 Drawing Sheets

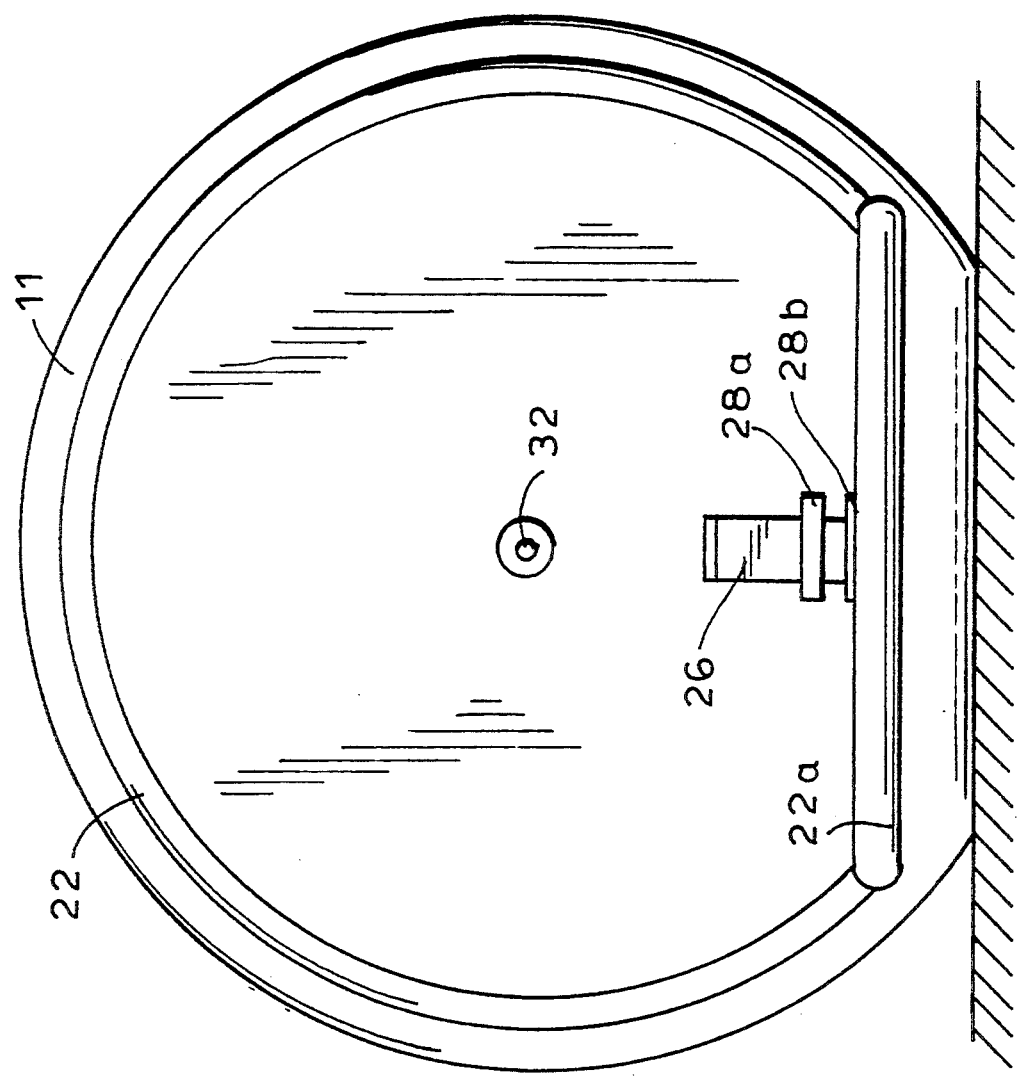
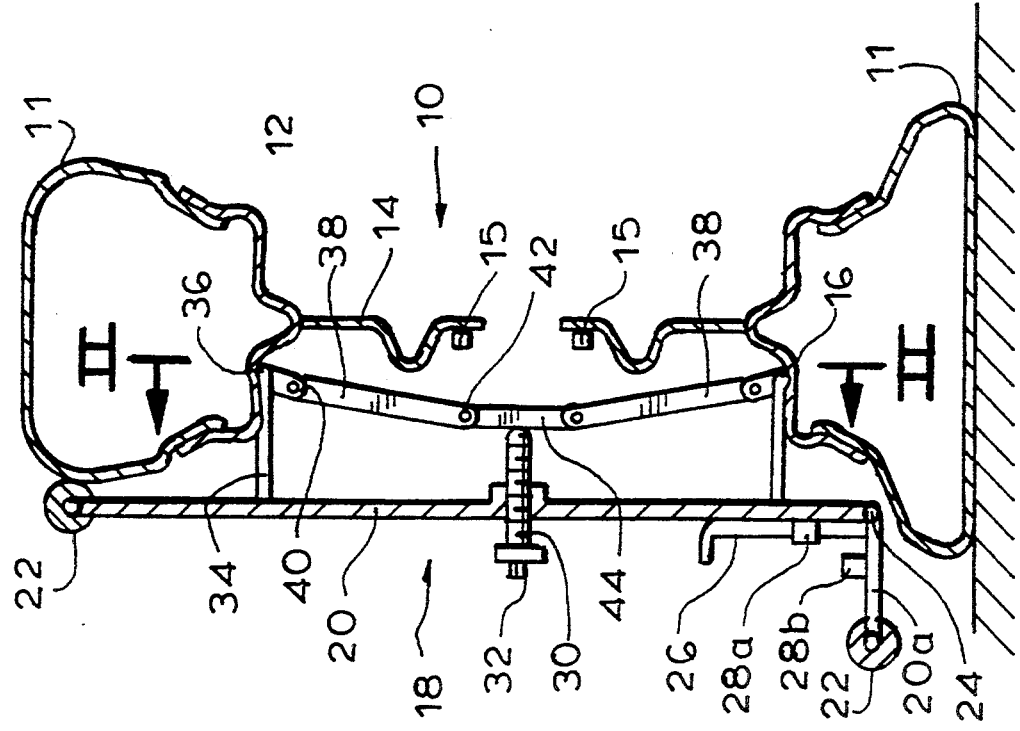

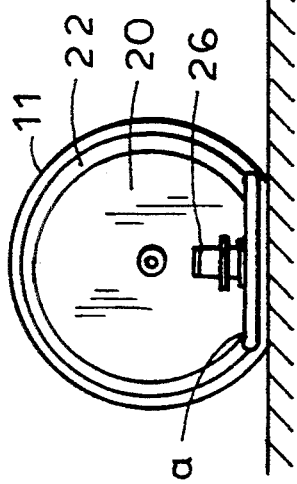
FIG.4a
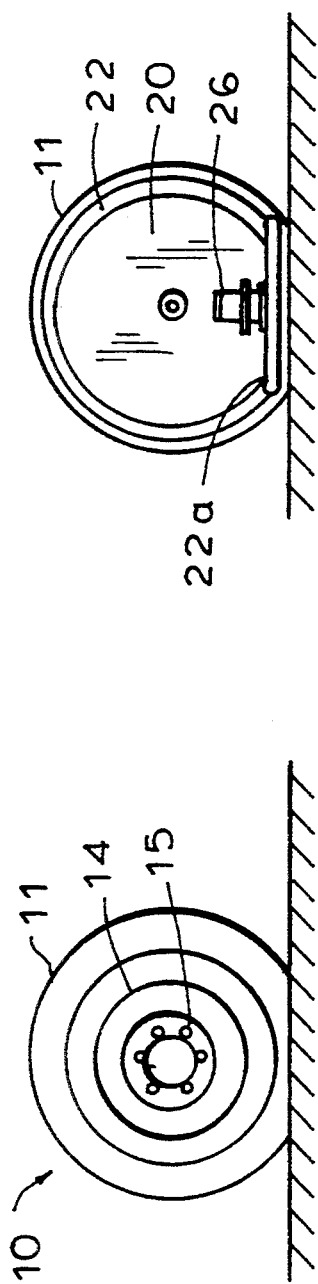
FIG.4b
FIG.4c
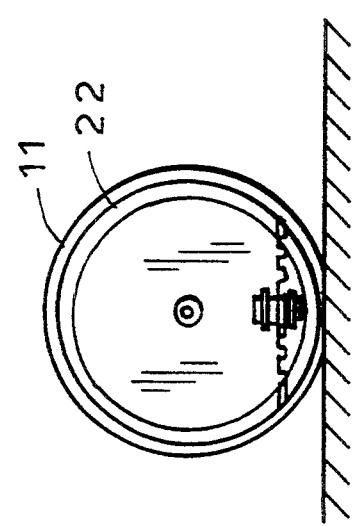
FIG.4e
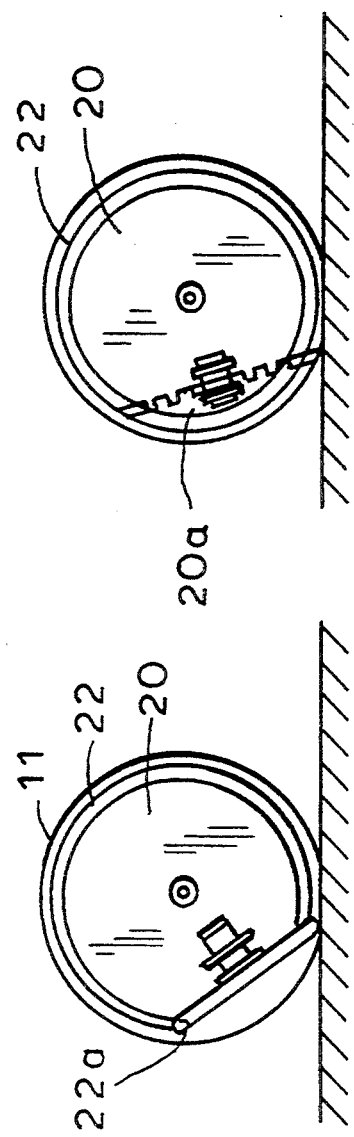
FIG.4d

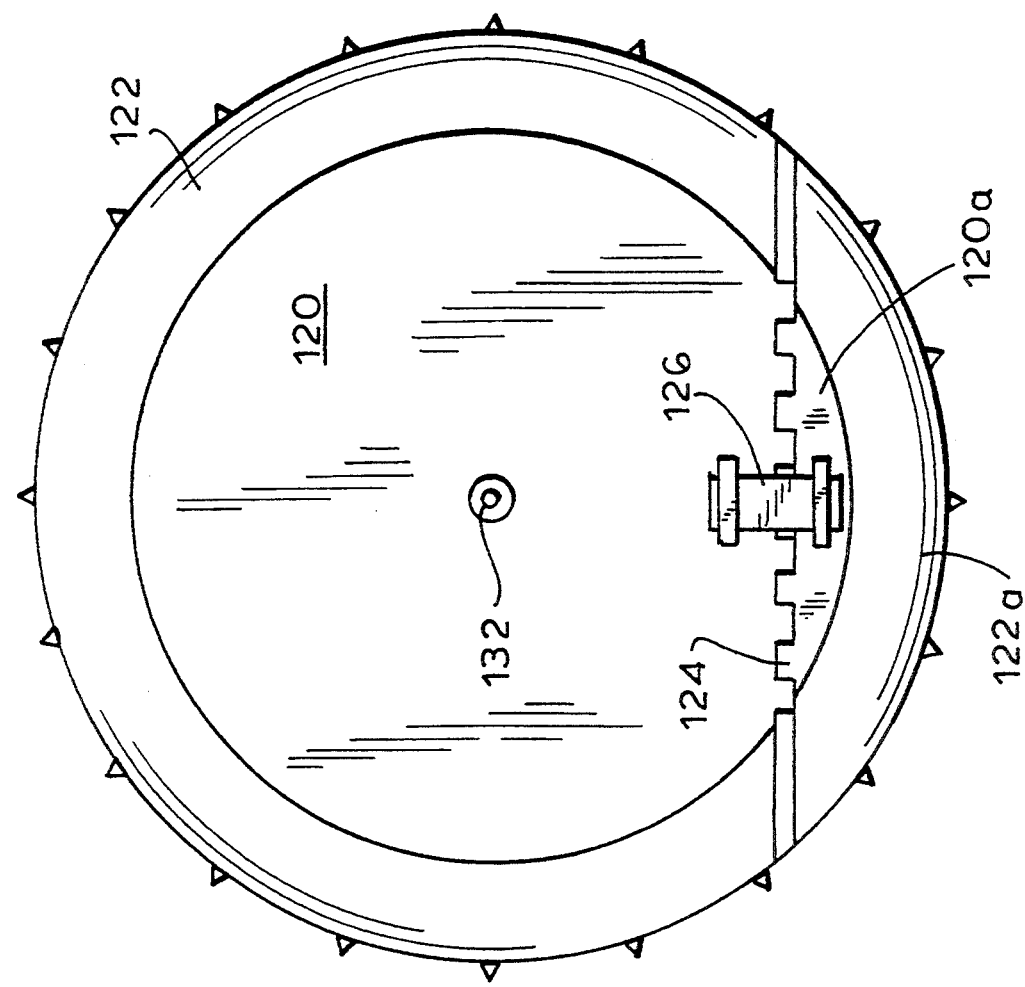
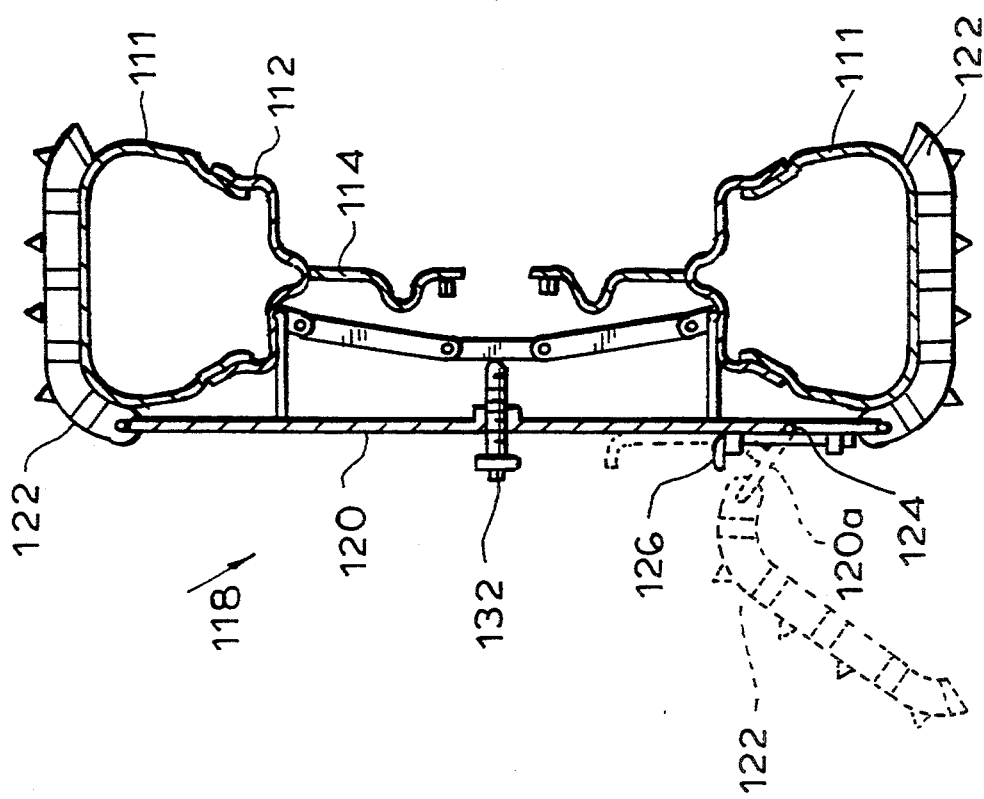
FIG.5b
FIG.5a

AUTOMOBILE TIRES ACCESSORY

BACKGROUND OF THE INVENTION

The present invention relates to automobile accessories, particularly to an accessory for use in case of a flat tire, or alternatively, as a replacement of the conventional snow chains.

As well known, the procedure of changing automobile wheels in case of flat tire is quite cumbersome and sometimes beyond the skill and power of certain drivers. It involves the lifting of the automobile on a jack, loosening the wheel mounting gudgeons or nuts, carrying away the damaged wheel and lifting it into the trunk, and assembling the spare wheel.

The mounting of snow chains is also most cumbersome needing both skill and physical force.

It has been attempted to overcome the difficulties involved in flat tire changing—see for example U.S. Pat. No. 3,295,894; however, the device proposed did not provide a satisfactory solution, since it was still required to remove at least three of the wheel mounting gudgeons, and it was generally of complicated—and therefore costly—construction.

The invention aims to provide means readily applicable by any driver that will make completely unnecessary the above described procedure of changing a wheel, and, according to modification thereof—to prepare the automobile for snow driving—all in a most convenient fashion.

SUMMARY OF THE INVENTION

According to one aspect of the invention there is provided a device for restoring a flat tire of automobile wheels having a wheel rim. The device comprises a circular plate of a diameter substantially equal to that of the tire, provided with a rubber or the like rim allowing the driving of the automobile thereon in substitution of the flat tire. A segment portion of the plate is displaceably connected thereto so that the portion is foldable away of the plane of the plate. The plate is mountable to the wheel rim, means being provided for securing the segment portion to the plate in the non-folded position thereof.

According to another aspect of the invention the device is used for snow driving, modified in that the rim is substituted by an annular tread configured to surround the automobile tire.

BRIEF DESCRIPTION OF THE DRAWINGS

These and further features and advantages of the invention will become readily understood in the light of the ensuing description of representative preferred embodiments thereof, given by way of example only with reference to the accompanying drawings wherein, FIG. 1a is a schematic cross-section showing the mounting of the device provided according to the invention to a flat tire wheel;

FIG. 1b is a side view of FIG. 1a;

FIG. 2 is a view taken along line II—II of FIG. 1a;

FIGS. 4a to 4e illustrate a sequence of operations for converting the device from the non-operative into the operative positions thereof; and FIGS. 5a and 5b illustrate the device according to a modified embodiment of the present invention useful for snow or sand driving.

DETAILED DESCRIPTION OF THE PREFERRED EMBODIMENTS

Figure 2:
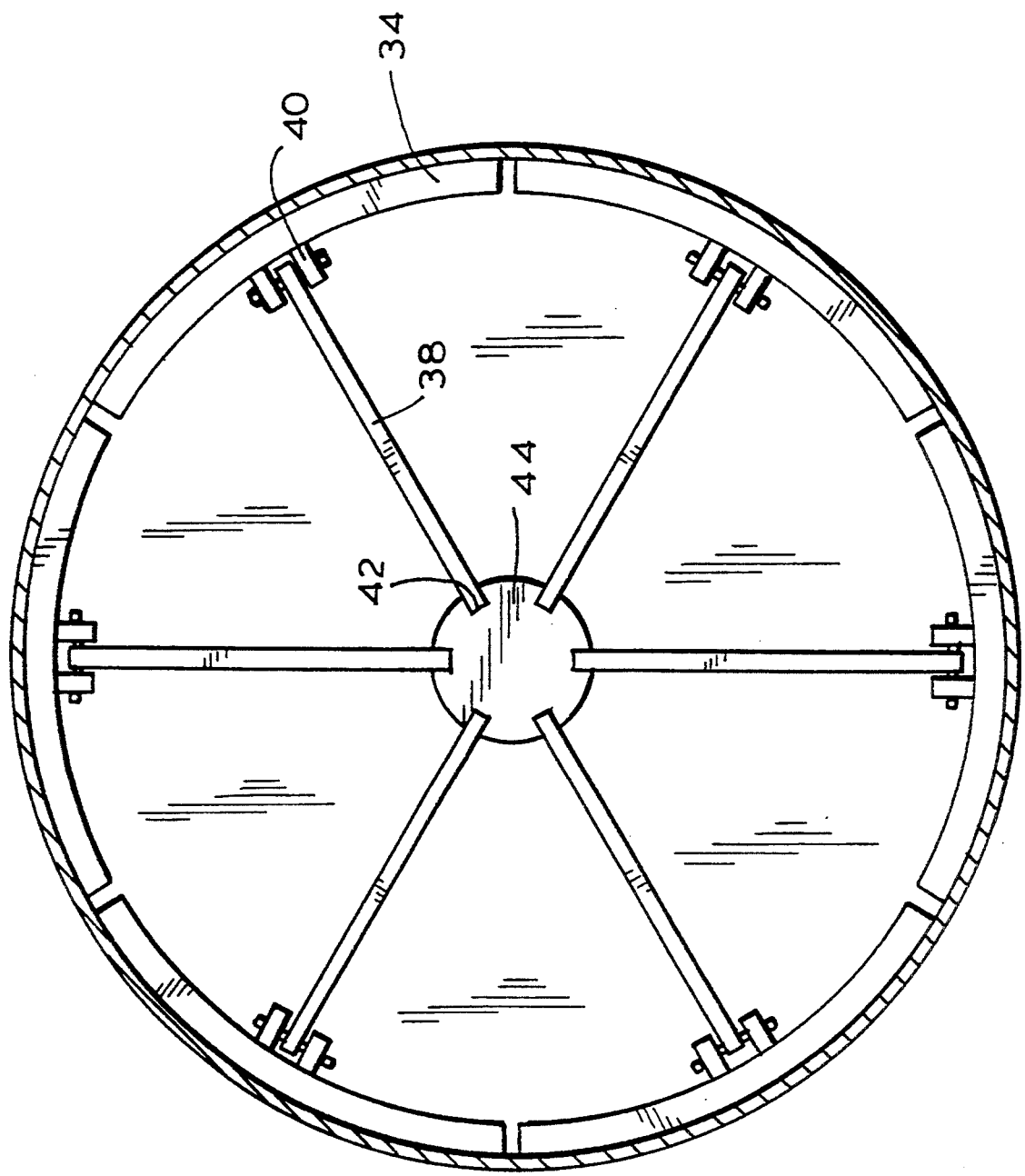

In FIG. 1a there is given a schematic cross-section of a typical automobile road wheel denoted 10, having a tire 11 and a rim which comprises a tire seat portion 12 and the central portion 14.

As found in most models of modern cars, the outer part of tire seat portion 12 is profiled so that a shallow cavity or recess 16 is formed. The invention is mainly applicable to this type of wheel rims.

The wheel 10 is fastened to the respective part of the automobile (not shown) by bolts or gudgeons 15.

The tire 11 is flat.

The device provided according to the invention, generally denoted 18 comprises a circular plate or disc 20 encircled by a torso like rim 22 made of rubber or the like elastic material, durable enough to replace the wheel and allow the driving of the car thereon, albeit slowly and for a limited mileage just to get to a location such as a gas station or the driver's own garage where the flat tire can be replaced or repaired more leisurely.

The diameter of the rim 22 is preferably somewhat smaller than that of the tire 11.

The plate 20 is of a composite structure, having a segment, flap-like portion thereof denoted 20a hinged to the remaining portion by a hinge 24 so that the segment 20a can be folded at right angles to the general plane of the plate 20, including its rim 22a. There is further provided a lock bolt 26 slidable in a first guide member 28a and a second guide member 28b as shown for a purpose to be described further below.

The plate 20 is adapted to be mounted onto the wheel 10, and safely secured thereto by a spider-type or any other suitable expansion mechanism, a preferred example thereof will now be described.

A pressure screw 30 is threadably received at the center of the plate 20, operable by a screw head 32 (which may be of the same size as the gudgeons 15).

A circular, multi-section ring 34 extends at the inside of the plate 20. The ring is divided into sections (six in the illustrated embodiment), each being adapted to individually flex in the radial direction (see FIG. 2). The springly displacement amount of each of the ring sections is small, just enough to become engaged by snapping its protruded, flaring rim 36 into the recess 16 (after loosening the screw 30—see below).

Each section of the ring 34 is connected via a linkage arm 38 and pivots 40, 42 to a central push plate 44. The plate 20 is thus readily mountable to the wheel rim, and the durable, safe engagement thereof is further attained by pushing the plate 44, using the standard automobile wrench on the bolt 30.

It will be now readily understood that the mounting of the device 18 onto the punctured wheel is only made possible due to the folding of the segment portion 20a in the manner shown in FIGS. 1a and 1b.

Figure 3B:
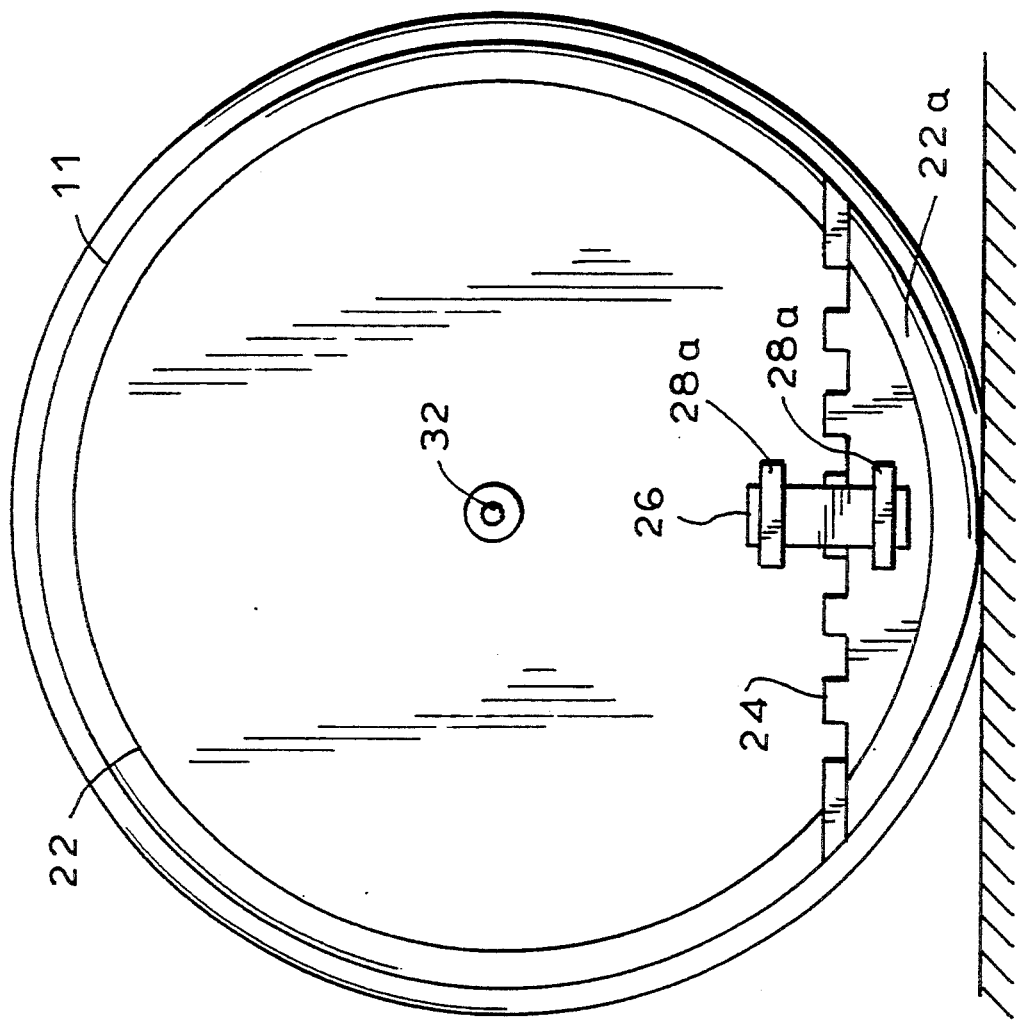
FIGS. 3a and 3b are sectional and side views, respectively, illustrating the operative position of the device.
Figure 3A:
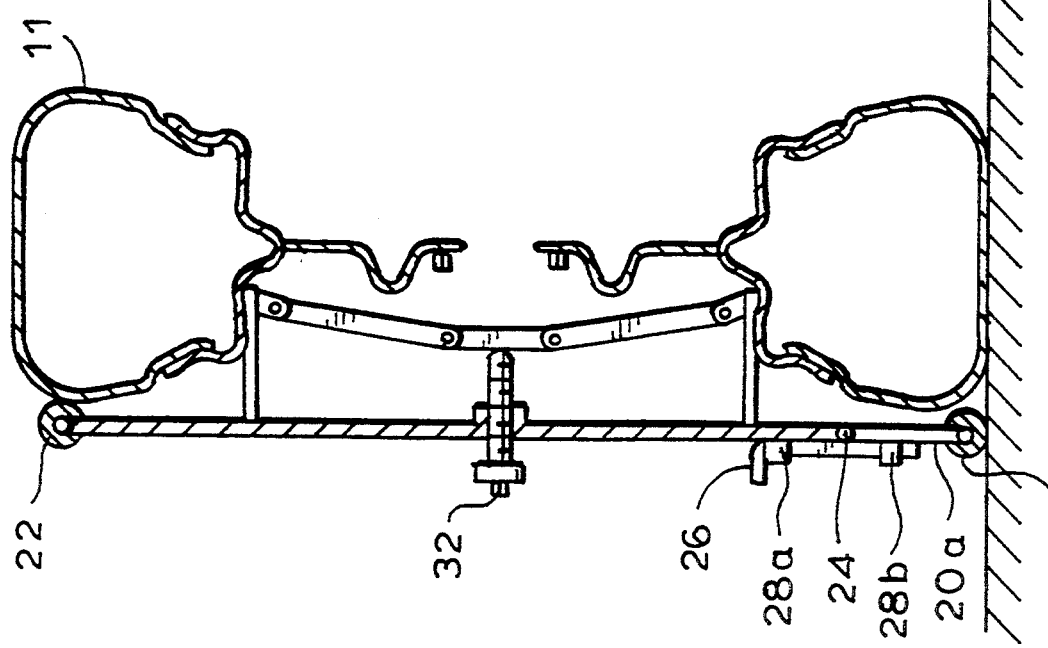

The operative, driving position of the device is illustrated in FIG. 3a and 3b. This position is achieved after certain maneuvering of the automobile described further below in conjunction with FIGS. 4a–4e; it should only be noted now that the segment flap 22a has reached a vertical position and can participate in supporting the flat tire, after being locked by the slide bolt 26 passed through guide members 28a and 28b.

The maneuvering procedure mentioned above is clearly illustrated in the series of FIGS. 4a–4e.

FIG. 4a is an elevation of a flat tire of an automobile.

FIG. 4b shows the wheel after the mounting of the device 18 thereto, i.e. equivalent to FIG. 1b as described above. Once secured to the wheel, the automobile is driven forwards or backwards to a small extent, which brings the rim 22 on the road while the segment 20a with its associated rim 22a rises, allowing its folding back into the complete circular position and secured in such position by the slide lock 26 (see FIG. 3b). Thereafter, the automobile can be driven—although slowly and carefully—for as long as required to reach a more convenient repairing location.

When it becomes necessary to prepare an automobile for driving in the snow (or, for that purpose, also on deep sand, mud, etc.) the modified attachment device of FIGS. 5a and 5b is applicable. Similar numerals are used to denote parts analogues to those of the preceding embodiment.

Hence, the snow driving device 118 comprises the divided circular plate 120, and the friction mounting coupling mechanism of the type described in connection with FIGS. 1a and 2, or any mechanical equivalent thereof.

The road driving rim 22 is replaced by an additional, annular the tread 122 which may take many forms to facilitate snow driving. In the example shown, the tread may be of steel-wire reinforced rubber, possibly with a plurality of cavities and/or spurs as shown, and is shaped to overly and embrace the top surface of the tire 111.

The segment portion 120a (with associated tread portion 122a) is again hinged (at 124) to the main portion 120, and adapted to be locked by the slide bolt 126.

The method of mounting of the device 118 is identical to that described in conjunction with FIGS. 4a–4e, above.

Those skilled in the art will readily appreciate that numerous variations and modifications may be applied to the heretofore described embodiments of the invention. For example, the folding-back of the segment 20a (120a) may be automatically effected by a linkage device which will release a spring loaded arrangement when the rim 22 has surmounted the road. It will thus render redundant the extra operation of getting out of the automobile to unfold and secure the segment flap. Such and other variations and modifications should be deemed to fall within the scope of the present invention as defined in and by the appended claims.

What is claimed is:

1. A device for restoring a flat tire of automobile wheels having a wheel rim, the device comprising:

a circular plate of a diameter substantially equal to that of the tire, provided with a rubber or the like rim allowing the driving of the automobile thereon in substitution of the flat tire, a segment portion of the plate being displaceably connected thereto so that the segment portion is foldable out of the plane of the plate, means for mounting the plate to the rim of the wheel, the means for mounting including a peripheral rim for engaging a recess portion of the wheel rim, the peripheral rim being shaped to snap into the recess portion when the plate is mounted to the rim of the wheel, and means for securing the segment portion to said plate in the non-folded position thereof.

2. The device as claimed in claim 1 wherein the mounting means comprises an expansion mechanism.

3. The device as claimed in claim 2, wherein the expansion mechanism includes a multi-section ring connected to the circular plate, and a central push plate, a linkage arm pivotably connecting each section of the ring to the central push plate, and means associated with the push plate for expanding and contracting the multi-section ring and wherein the peripheral rim is on the multi-section ring.

4. The device as claimed in claim 1 wherein the segment portion is hinged to the plate.

5. The device as claimed in claim 4 wherein said securing means comprises a slidable bolt.

6. A device as claimed in claim 1 for snow driving wherein said rubber or the like rim is an annular tread configured to surround the automobile tire.

7. A device as claimed in claim 1, wherein the peripheral rim has a protruding, flaring shape, and the recess portion of the wheel rim has a corresponding shape such that the peripheral rim engages the recess portion of the wheel rim.

* * * * *